United States Patent [19]

Tischer

[11] Patent Number: 4,488,401
[45] Date of Patent: Dec. 18, 1984

[54] HYDRAULIC SERVO STEERING FOR VEHICLES

[75] Inventor: Werner Tischer, Böbingen, Fed. Rep. of Germany

[73] Assignee: Zahnradfabrik Friedrichshafen, A.G., Friedrichshafen, Fed. Rep. of Germany

[21] Appl. No.: 382,934

[22] Filed: May 28, 1982

[30] Foreign Application Priority Data

Jun. 25, 1981 [DE] Fed. Rep. of Germany ....... 3124939

[51] Int. Cl.³ .............................................. F16D 31/02
[52] U.S. Cl. ........................................ 60/384; 91/448; 91/516; 91/530
[58] Field of Search .................. 60/384; 91/444, 448, 91/530, 531, 532, 533, 516, 520, 450, 526

[56] References Cited

U.S. PATENT DOCUMENTS 4,174,018 11/1979 Liebert et al. .................. 91/532

FOREIGN PATENT DOCUMENTS 0157804 9/1982 Japan .................................. 91/448
0810602 3/1981 U.S.S.R. ............................. 91/448

Primary Examiner—Robert E. Garrett
Assistant Examiner—Timothy E. Nauman
Attorney, Agent, or Firm—Zalkind & Shuster

[57] ABSTRACT

A flow regulating channel in a servo steering valve controls exhaust flow with varying restriction from a fluid operating motor while controlling operation of a separate steering servo motor on a priority basis. An operational control valve for the fluid operating motor has a valve passage that is open only in the neutral position to complete a recirculating flow path from a common servo pump through the flow regulating channel that is fully open in the neutral position of the steering valve.

10 Claims, 1 Drawing Figure

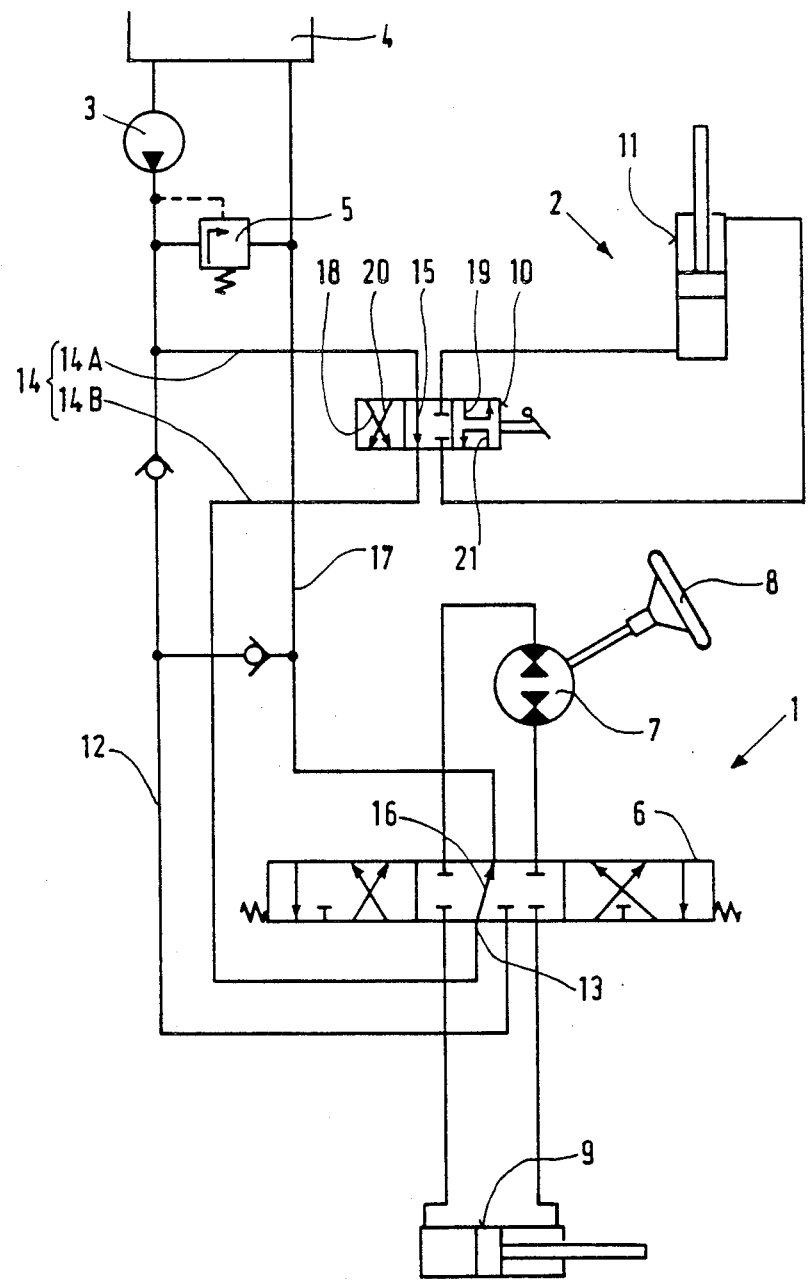

HYDRAULIC SERVO STEERING FOR VEHICLES

BACKGROUND OF THE INVENTION

This invention relates to a hydraulic servo steering system for automotive vehicles associated with a source of pressurized fluid which is also utilized for a fluid operating motor under valve control serving a different function from that of the servo steering motor.

According to the disclosure in German patent publication OS No. 23 60 610, an automotive servo steering system is provided in combination with an additional fluid operated device. In such prior art arrangement, both the steering servo motor and the additional operating fluid motor are supplied with a pressurized medium or fluid from a single servo pump. However, priority is given to the servo steering system with respect to the supply of pressurized fluid, although in the neutral position of the steering control valve the pressurized fluid is supplied completely to the additional fluid operated device. On the other hand, when the steering control valve is substantially displaced from the neutral position, flow of the pressurized fluid to the fluid operated device is completely blocked. The additional fluid operated device when hydraulically connected through its control circuit to the fluid reservoir associated with a servo pump, is responsible to cavitation effects in its supply line. Also, in such prior art arrangement, uncontrolled run away operation of the additional fluid operated device is possible under certain conditions. Still further, the cavitation aforementioned may adversely affect the servo steering circuit through the steering control valve.

It is therefore an important object of the present invention to provide a servo steering system in combination with an additional fluid operated device avoiding the disadvantages of the aforementioned prior art arrangements.

SUMMARY OF THE INVENTION

In accordance with the present invention, the control valves respectively associated with a servo steering circuit and the fluid operating circuit for an additional fluid operated motor are respectively provided with by-pass valve passages through which recirculating flow is established between the servo pump and the fluid reservoir serving both circuits only when both control valves are in their neutral positions. In such neutral positions, the steering servo motor and the additional fluid operated motor are bypassed and hydraulically locked through their associated control valves. An exhaust flow passage in the steering control valve fully open in the neutral position is progressively restricted in response to displacement thereof from its neutral position to conduct fluid to the reservoir from the common servo pump in series through the additional fluid operated motor and its control valve to the reservoir during operation of both fluid motors on a substantially equal basis. The control valve for the additional fluid operated motor, on the other hand, is open only in its neutral position. In the extreme steering positions of the servo control valve, its exhaust flow passage is completely closed to then block flow of fluid through the additional fluid operated motor while full flow to the steering servo is established on a priority basis.

BRIEF DESCRIPTION OF THE DRAWING

The invention will be described hereinafter in greater detail with reference to the accompanying drawing which is a fluid circuit diagram of one embodiment of the invention.

DETAILED DESCRIPTION OF THE PREFERRED EMBODIMENT

Referring now to the drawing in detail, a servo steering circuit 1 is shown together with an operating circuit 2 performing a function different from the servo steering function of fluid circuit 1. Both fluid circuits 1 and 2 receive pressurized fluid delivered by a single servo pump 3, the fluid being derived from a reservoir 4. The pressure of the fluid delivered by the servo pump 3 is limited to a maximum value by a pressure limiting valve 5 interconnected between the output side of the pump 3 and a low pressure return line 17 to the reservoir 4.

The servo steering circuit 1 includes a steering control valve 6, and a flow metering control pump 7 both of which are actuated under control of a hand steering wheel 8 as diagrammatically shown in the drawing. The flow metering pump 7 will be hydraulically connected in series with the servo pump 3 to a steering servo motor 9 in response to actuation of the steering control valve 6, as is already well known in the art. The operating circuit 2, on the other hand, includes a manually operable, on-off control valve 10 of the four port and three position type for controlling the supply and exhaust of fluid to an additional fluid operated motor 11.

The fluid connections established by the steering control valve 6 between the servo motor 9, the metering control pump 7, the reservoir 4 and the servo pump 3 are generally well known including the usual pressure supply conduit 12 extending from the servo pump to the control valve. In accordance with the present invention however, an additional branch pressure line 14 is provided to a port 13 of the steering control valve 6. The branch pressure line 14 includes a branch section 14A connected to a special valve passage 15 in the on-off valve 10 and a section 14B interconnected between an outlet port of the valve 10 and the port 13 of the steering control valve 6. In this manner, the branch pressure line 14 conducts flow of the fluid from the servo pump 3 so as to regulate the operating pressure supplied to the steering control valve in its neutral position while the on-off control valve 10 is also in the neutral position. The regulating fluid flow stream is directed in such case through a flow channel 16 in the steering control valve 6 which is fully open in the neutral position to recirculate fluid to the reservoir 4 through the return flow line 17.

The on-off control valve 10 in its neutral position blocks flow to and from the additional flow operated motor so as to hydraulically lock it in position. When displaced to the opposite operating positions from the neutral position, the on-off control valve 10 will always supply pressurized fluid through passage 18 or 19 to the motor 11 and will always exhaust fluid therefrom through valve passage 20 or 21 in a manner generally well known in the art with respect to such control valves. Thus, by actuation of the on-off control valve 10, a directionally controlled supply of pressurized fluid from the servo pump 3 to the motor 11 will be effected through branch section 14A while exhaust fluid will be conducted to the reservoir through return line 17.

In response to displacement of the steering control valve 6 from its neutral position in either direction, the fluid regulating passage 16 therein will be progressively closed in order to regulate servo pressure. When the steering control valve reaches either of its extreme fully displaced steering positions, the flow regulating channel 16 therein is completely closed at which point maximum regulated pressure is available for the servo motor 9 since return flow to line 17 from passage 16 will be completely blocked while pressurized fluid is still supplied from the servo pump 3 to both fluid operating circuits. Since return flow through line 17 is progressively restricted by the steering control valve in response to displacement thereof from the neutral position, there will always be less than maximum pressurized fluid available to the additional fluid operated motor 11. Thus, supply of pressurized fluid to the servo steering circuit 1 takes priority over supply to the operating circuit 2 as a function of displacement of the steering control valve 6.

Inasmuch as the supply of pressurized fluid to the additional fluid operated motor 11 remains intact while return flow therefrom is restricted and then blocked under control of the steering control valve 6, no cavitation may occur in the operating circuit 2 for the additional fluid operated motor 11. Uncontrolled motor run away is furthermore not possible in view of the relationship between the fluid circuits 1 and 2 as hereinbefore described.

What is claimed is:

1. In combination with a fluid servo steering system having a reservoir, a servo pump, a servo motor and a steering valve device responsive to displacement thereof from a neutral position for controlling preferential flow of pressurized fluid from the pump to the servo motor and exhaust of the fluid from the servo motor to the reservoir, an additional fluid operated motor and an on-off valve device connected to the pump in parallel with the steering valve device and displaceable from a neutral position thereof for supplying the pressurized fluid from the pump to the additional fluid operated motor, recirculating means (14) open only in the neutral position of both of the valve devices (6, 10) for conducting the fluid between the servo pump (3) and the reservoir (4) in bypass relation to the servo motor (9) and the additional fluid operated motor (11) while respectively blocking flow to and from said motors, the improvement comprising exhaust flow passages means (14B, 16) controlled by the steering valve device for conducting the fluid to the reservoir through a communication path from the additional fluid operated motor in response to said displacement of the on-off valve device from the neutral position, and valve passage means (15) in the on-off valve device open only in the netural position thereof for establishing fluid communication between the servo pump and the exhaust flow passage means, the steering valve device being displaceable from the neutral position to extreme operating positions in which the exhaust flow passage means is closed to block the return of the fluid through the communication path to the reservoir from the additional fluid operated motor.

2. The improvement as defined in claim 1 wherein the exhaust flow passage means includes a flow regulating channel (16) in the steering valve device and a pressure conduit section (14B) interconnecting the valve passage means and the flow regulating channel in series between the servo pump and the reservoir.

3. The combination as defined in claim 2 wherein the fluid servo steering system further includes a fluid metering pump (7) connected in series between the servo pump and the servo motor by the steering valve device when displaced from the neutral position, and steering control means (8) connected to the metering pump for operation thereof.

4. The combination of claim 3 including manually operable actuating means for displacing the on-off valve device from the neutral position.

5. The combination of claim 1 wherein the fluid servo steering system further includes a fluid metering pump (7) connected in series between the servo pump and the servo motor by the steering valve device when displaced from the neutral position, and steering control means (8) connected to the metering pump for operation thereof.

6. The combination of claim 5 including manually operable actuating means for displacing the on-off valve device from the neutral position.

7. In combination with at least two fluid operated devices (9, 11) to which pressurized fluid is supplied from a common pump (3) under control of a pair of valves (6, 10) displaceable from neutral positions, the improvement comprising operating circuit means connected to one of the fluid operated devices (11) for conducting the pressurized fluid therethrough in series with the two valves in response to displacement of one of the valves (10) from the neutral position thereof, and flow regulating means (16) responsive to displacement of the other of the valves (6) from the neutral position thereof for reducing flow of the pressurized fluid conducted through said one of the fluid operated devices (11) while flow of the pressurized fluid to the other of the fluid operated devices (9) is increased.

8. The combination of claim 7 including priority circuit means connecting the other of the valves (6) to the other of the fluid operated devices (9) for conducting the pressurized fluid therethrough.

9. The improvement as defined in claim 8 wherein the other of the valves (6) is displaceable from the neutral position to extreme positions in which the regulating means (16) blocks flow of the pressurized fluid through said one of the fluid operated devices (11).

10. The improvement as defined in claim 8 wherein the other of the valves (6) is displaceable from the neutral position to extreme positions in which the regulating means (16) blocks flow of the pressurized fluid through said one of the fluid operated devices (11).

* * * * *